United States Patent [11] 3,568,585

[72] Inventor Sunao Ishizaka
 Tokyo, Japan
[21] Appl. No. 743,884
[22] Filed July 10, 1968
[45] Patented Mar. 9, 1971
[73] Assignee Nippon Kogaku K. K.
 Tokyo, Japan
[32] Priority July 18, 1967
[33] Japan
[31] 42/45813

[54] SHOCK-ABSORBING MECHANISM FOR THE VIEWING MIRROR OF A SINGLE LENS REFLEX CAMERA
5 Claims, 5 Drawing Figs.

[52] U.S. Cl. .................................................. 95/42
[51] Int. Cl. .......................................... G03b 19/12
[50] Field of Search ....................................... 95/42
 (Inquired)

[56] References Cited
UNITED STATES PATENTS
2,992,602  7/1961  Heden ........................ 95/42
3,468,232  9/1969  Knapp ........................ 95/42

Primary Examiner—Samuel S. Matthews
Assistant Examiner—Richard L. Moses
Attorney—Anton J. Wille ABSTRACT: A shock-absorbing mechanism is provided for the viewing mirror of a single lens reflex camera. A spring-biased shock-absorbing lever having a pin or protuberance in the path of the mirror absorbs the impact forces. A spring-biased latch cooperation with the shock-absorbing lever latching the lever immediately before the mirror is moved into its raised position. The viewing mirror is thus moved to its raised position without impact.

Patented March 9, 1971 3,568,585

SHOCK-ABSORBING MECHANISM FOR THE VIEWING MIRROR OF A SINGLE LENS REFLEX CAMERA

This invention relates to a shock-absorbing mechanism for the viewing mirror of a single lens reflex camera.

The viewing mirror of a single lens reflex camera is moved into its viewing position, usually at a 45° angle with the axis of the objective lens, preparatory to the exposure of the film. A return mechanism coupled with the shutter release, moves the mirror to its raised or home position an instant before the shutter is released. To move the mirror out of the way quickly for film exposure, a force is required that leads to impact and noise when the mirror abuts its stop in its raised position. The impact force of the mirror abutting its stop can cause a slight movement of the camera resulting in a blurred exposure. The noise of such impact can also be very disturbing and even intrusive depending upon the circumstances under which an exposure is made.

In the past, various expedients have been tried to eliminate or at least alleviate the mirror impact shock. Such expedients have not proven successful and cameras today of the single lens reflex type are still provided with small sponge or rubber bumpers as stops for the viewing mirror.

The object of the present invention is to provide a relatively simple and efficient shock-absorbing mechanism for the viewing mirror of a single lens reflex camera by which the shock of impact of the mirror is dissipated by a spring biased lever before the mirror is returned to its raised position by the mirror return mechanism of the camera.

Another object of the invention is the provision of a collapsible parallelogram linkage arrangement for raising and lowering the viewing mirror by the mirror mechanism of the camera.

According to the invention, the mirror-actuating mechanism of the camera will operate to raise and lower the viewing mirror in a manner known in the art. Pivotably mounted within the mirror box or enclosure are two cooperating levers, a shock-absorbing lever and a latch lever. Each of the levers is spring biased, the shock-absorbing lever being biased in a direction opposite to the direction of travel of the mirror moving from its viewing position to its raised position, while the latch lever is biased in the same direction as the direction of travel of the mirror to its raised position. With the mirror in its viewing position, a pin on the mirror is abutted by the latch lever. As the mirror is moved towards its raised position, it abuts a pin or extension fixed to the shock absorbing lever and moves the lever against the bias of its spring thereby absorbing the forces of movement of the mirror. As the mirror travels towards its raised position, the latch lever is released permitting its spring to move a detent into the path of movement of the shock-absorbing lever, the detent catching and holding the shock-absorbing lever just before the mirror moves into its raised position. The mirror moves against the stop provided for it with no impact shock or noise.

In one embodiment of the invention, a parallelogram linkage system is provided actuated by the mirror-operating mechanism of the camera, the mirror being pivotally mounted on one of the pivot points of the linkage.

The invention both as to its organization and content, will be better understood from the following detailed description when taken in conjunction with the annexed drawing, in which.

Figure 1:
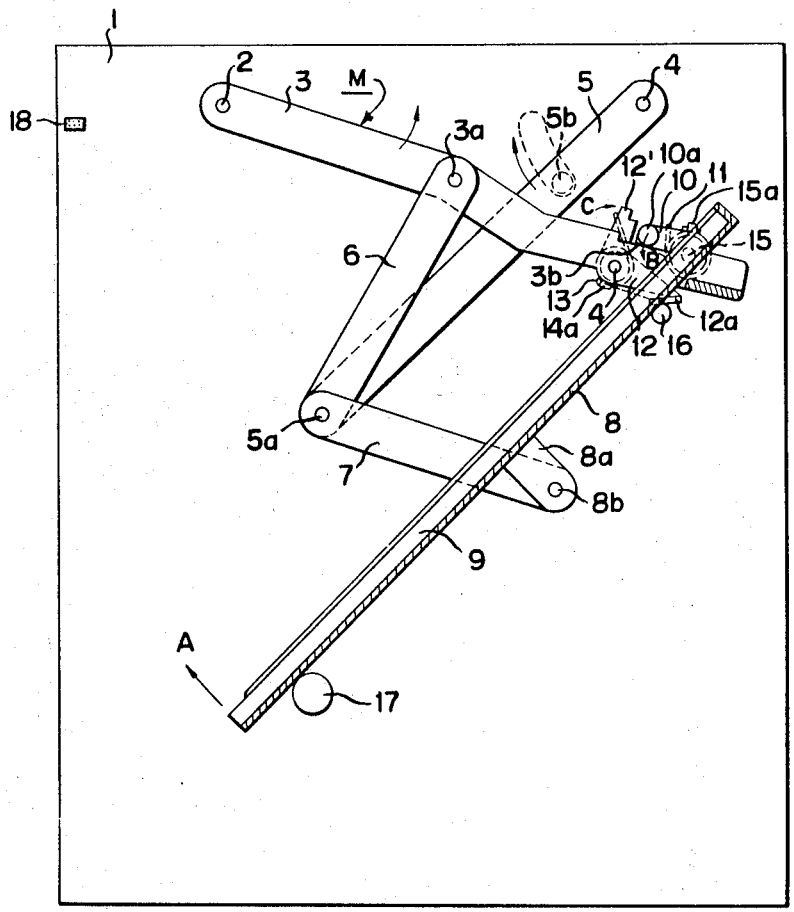
FIG. 1 is a side elevational view with portions in cross section, illustrating the mirror enclosure of a single lens reflex camera and a parallelogram linkage system for raising and lowering the viewing mirror, together with a shock-absorbing mechanism embodying the invention, the viewing mirror being illustrated in its viewing position.
Figure 2:
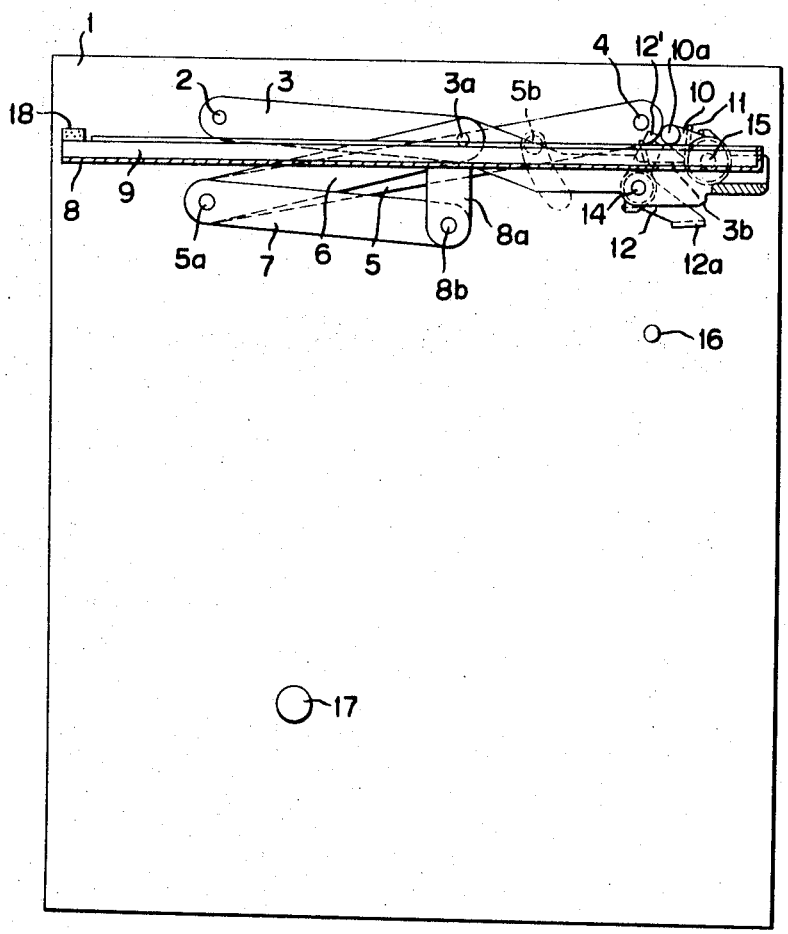
FIG. 2 is a view similar to FIG. 1 showing the mirror in its raised position.
Figure 3:
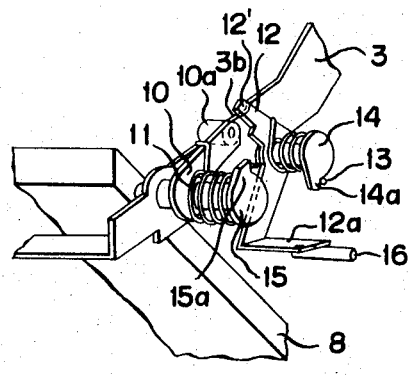
FIG. 3 is a perspective view of the shock-absorbing mechanism embodying the invention.

Referring now in detail to FIGS. 1 through 3 of the drawings, only the mirror enclosure 1 of a single lens reflex camera is illustrated, the enclosure or box supporting the shock absorbing structure embodying the invention. Rotatably mounted on a shaft 2 secured to a wall of the box 1 is a substantially U-shaped member M which extends rearwardly and having pivotally mounted at its other end a stud shaft 15 secured in the support plate 8 of the viewing mirror 9. The U-shaped member has two spaced arms 3, only one arm being illustrated, one on each side of the mirror, the ends of the arms, or levers 3 as they shall hereinafter be referred to, being pivoted on shaft 2 at one end and a stud shaft 15 (only one shown) secured on the side of the mirror support plate 8. Pivotally mounted on a shaft 4 secured in the box 1 is a drive lever 5, the other end of which supports a shaft 5a and intermediate its ends a pin 5b which is moved by conventional means (not shown) to raise the mirror 9, and lower the same.

A connecting lever 6 is pivotally mounted at one end of the shaft 5a and at the other end on a pin 3a provided on lever 3. A second connecting lever 7 is provided also pivoted on one end on the shaft 5a and at the other end on a shaft 8b provided on an extending arm 8a of the mirror support plate 8. It will be noted that the levers 3, 6 and 7, and the mirror support plate 8 form a parallelogram between their respective pivot points.

Rotatably mounted on shaft 15 FIG. 3 on the support plate 8 is a shock-absorbing lever 10 provided on its free end with an extending pin 10a adapted to abut the lever 3. The pin 10a is also in the path of the support plate 9, as will hereinafter be made apparent. A coil spring 11 secured at one end to the lever and at the other end to a fixed retainer 15a on the shaft, biases the shock-absorbing lever counterclockwise in the direction of arrow B in FIG. 1, the pin 10a abutting the lever 3 when the mirror 9 is in its viewing or lowered position.

A latch 12 for the shock-absorbing lever 10 is provided, the latch being rotatably supported on a shaft 14 secured to the lever 3 adjacent the abutment point of the lever pin 10a. (FIG. 3). A spring 13 secured at one end to the latch 12 and at the other end to a fixed projection 14a of the pin biases the latch in a clockwise direction shown by the arrow C in FIG. 1. The latch 12 is provided with a bent portion 12a which abuts a pin 16 secured to the mirror enclosure 1 when the mirror 9 is in its viewing position as illustrated in FIG. 1. A stop 17 is provided on the mirror enclosure to limit the movement of the mirror in its viewing or lowered position and a second stop 18 to limit the upward movement or raised position of the mirror.

When the mirror is lowered by means well known in the art and not herein illustrated, the latch 12 is rotated counterclockwise against the bias of the spring 13 by the abutment of the bent portion 12a thereof and the enclosure fixed pin 16. As will hereinafter appear, the latch 12 releases the shock-absorbing lever 10 to permit rotation thereof in the direction of the arrow B in FIG. 1 until the pin 10a engages the lever 3.

In the lowered or viewing position as illustrated in FIG. 1, movement of the pin 5b raises the mirror in the known manner, the mirror 9 being moved to its raised position against the stop 18 (FIG. 2) by the clockwise rotation of the drive lever 5 and upward movement of the connecting lever 7. Lever 3 through the linkage provided by lever 6 is rotated counterclockwise about shaft 2.

As the mirror 9 moves upwardly, about halfway between its viewing position and raised position, the mirror support plate 9 engages the shock-absorbing pin 10a. The continued upward movement of the mirror toward its raised position will rotate the shock-absorbing lever 10 clockwise against the bias of the shock-absorbing spring 11. With the upward movement of lever 3, the bent portion 12a of the latch 12 moves away from the fixed pin 16 permitting rotation of the latch by its spring 11 in a clockwise direction. A shoulder portion 12' on the latch 12 thus moves into the path of the shock-absorbing lever 10 immediately before the mirror reaches its raised position. The mirror 9 is thus moved to its raised position against the stop 18, the latch 12 holding the shock-absorbing lever 10 in the raised position and preventing any return movement of the mirror towards its viewing position by the shock-absorbing spring 11.

When the mirror is again moved to its viewing position preparatory to making another exposure, only the force of the drive lever 5 moves the mirror, the spring 11 being held inoperative by the latching arrangement described. It is only toward the end of travel of the mirror to its viewing position that the bent portion 12a engages the fixed pin 16. The latch 12 is thus rotated counterclockwise to release the shock-absorbing lever 10 whereupon it is returned by spring 11 to its position with the pin 10a abutting the lever 3 as in FIG. 1. It should be noted that what little shock there is upon release of the shock-absorbing lever 10 is transmitted to the lever 3 and not to the mirror support plate 8.

Figure 4:
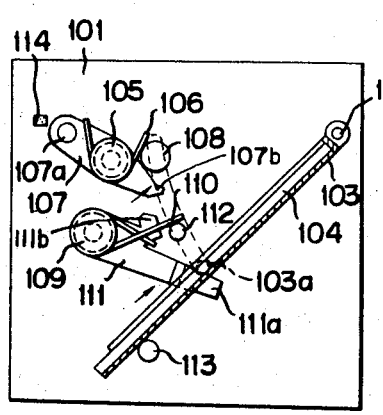
FIG. 4 is a side elevational view illustrating a second embodiment of the invention, the mirror being in its viewing position.
Figure 5:
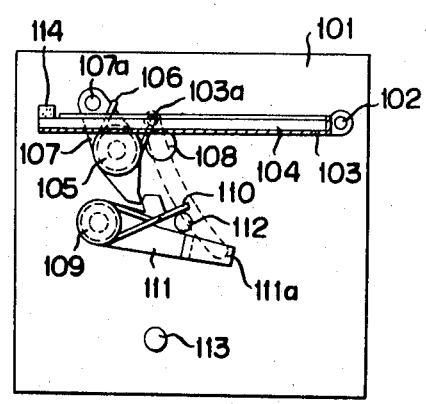
FIG. 5 is a view similar to FIG. 4 showing the mirror in its raised position.

Referring now to FIGS. 4 and 5 of the drawings wherein another embodiment of the invention is illustrated, the mirror enclosure or box 101 of the camera is provided with a shaft 102 rotatably supporting a support plate 103 for the viewing mirror 104. The mirror plate 103 is provided with a pin 103a projecting into the path of movement of the tail portion 111a of a latch 111 pivotally mounted on a shaft 109 secured to the mirror enclosure. A spring 110 is provided for the latch, one end of the spring being hooked to the latch while the other is held by a fixed pin 112. The spring 110 biases the latch 111 in a counterclockwise direction. A shock-absorbing lever 107 is rotatably mounted on a shaft 105 fixed in the enclosure, the lever being provided with a pin 107a which extends into the path of travel of the mirror from its viewing position against stop 113 to its raised position against a stop 114. A shock-absorbing spring 106 fixed at the ends to the lever 107 and fixed pin 108 rotates the lever in a counterclockwise direction, the pin 108 limiting the counterclockwise movement of the lever.

A U-shaped lever (not shown in FIGS. 4 and 5) operated in the well-known manner and similar to that illustrated in FIG. 1, for raising and lowering the mirror may be used; such lever being pivoted at one end on pin 103a with the other end pivoted to a shaft fixed in the mirror enclosure.

In raising the mirror from its viewing position illustrated in FIG. 4, the tail portion 111a being freed of pin 103a permits counterclockwise rotation of the latch 111 toward its limit stop 112. The upward movement of the mirror brings the support plate 103 into abutment with the pin 107a on the shock-absorbing lever 107, rotating the lever in a clockwise direction against the bias of the shock-absorbing spring 106. Immediately before the mirror reaches its raised position against stop 114, a projection 111b on the latch is moved into the path of the tip 107b of the shock-absorbing lever to hold the shock-absorbing lever 107 and prevent any return movement of the mirror by the biased spring 107.

Upon lowering of the mirror 104 to its viewing position, the latch tail 111a is abutted by the support plate pin 103a just before the mirror reaches its viewing position thereby rotating the latch in a clockwise direction to release the shock-absorbing lever 107. The lever is rotated clockwise by the spring 106 to its position against the stop 108. What little shock there is by this return movement is transmitted to the stop pin and not to the mirror or its support plate.

It will be obvious to those skilled in the art that appropriate frictional means be included between the shaft 15 and the shock-absorbing lever 11 of FIGS. 1 through 3, and similar means between the shaft 105 and the shock-absorbing lever 107 of FIGS. 4 and 5, the frictional means aiding the shock-absorbing effects of the springs 13 and 106.

There is thus provided a shock-absorbing arrangement for the viewing mirror of a camera in which the shock-absorbing springs provided have no effect on the relationship of the mirror-raising spring after the mirror support plate and the shock-absorbing lever abut during a lifting movement by the mirror springs. Since the mirror completes its lifting movement with the shock-absorbing spring latched, it is possible to make the shock-absorbing spring quite strong and yet provide for a quick and complete return of the mirror to its raised position without shock and without noise. Since in a single lens reflex camera, the mirror is raised an instant before the shutter is released, the structures herein described will prevent blurring of the exposures made due to mirror impact. By adjusting the bias of the spring 13 and spring 110 provided for the latches 12 and 107 further shock-absorbing effects may be realized when the mirror is moved to its viewing position.

I claim:

1. Shock-absorbing mechanism for the viewing mirror of a single lens reflex camera having a mirror-operating mechanism for moving the mirror between a viewing position and a raised position, the combination comprising:

a viewing mirror support plate pivotably mounted within the camera body;

a shock-absorbing lever pivotably mounted within the camera body;

a pin on the shock-absorbing lever extending into the path of the mirror plate;

a first spring biasing the shock-absorbing lever in a direction opposite to the direction of travel of the mirror from its viewing position to its raised portion;

a latch lever pivotably mounted within the camera body;

a second spring biasing the latch lever in a direction opposite to the biased direction of the shock-absorbing lever;

a detent portion on the latch lever cooperating with the shock-absorbing lever;

a pin on the mirror plate abutted by the latch lever when the mirror is in its viewing position; and movement of the mirror towards its raised position bringing about the abutment of the mirror and the shock-absorbing lever pin to move said lever against the bias of the first spring; the latch lever, being released by the movement of the mirror to its raised position, is moved by the bias of the second spring to bring the detent portion thereof into latching position to latch the shock-absorbing lever immediately before the mirror is moved to its raised position.

2. Shock-absorbing mechanism according to claim 1, wherein:

a U-shaped member having two spaced arms is pivotably supported at the spaced ends of the arms to the camera body;

the viewing mirror support plate being pivotally supported at the opposite ends of the U-shaped member arms, the shock-absorbing lever and the latch lever being pivotably mounted on an arm of the U-shaped member; and means interconnecting the mirror plate with the mirror plate operating mechanism of the camera to move the mirror plate between its viewing position and its raised position.

3. Shock-absorbing mechanism according to claim 2, wherein a drive lever is pivotably mounted at one end to the camera body and movable by the mirror-operating mechanism of the camera;

a first connecting lever pivoted at one end to an arm of the U-shaped member and pivoted at the other end to the free end of the drive lever;

a second connecting lever pivoted at one end with the first connecting lever to the free end of the drive lever and pivotably connected at the other end to the mirror support plate; and the two connecting levers and portions of the U-shaped member arm and mirror plate between the pivotal connections forming substantially a parallelogram linkage system.

4. Shock-absorbing mechanism according to claim 3, wherein the pivot point of the mirror support plate and the pivot point of the free end of the lever and the two connecting levers are on diagonally opposite corners of the parallelogram linkage system.

5. In a reflex camera having a mirror-operating mechanism for moving the viewing mirror between a viewing position and a raised position, the combination comprising:
- a U-shaped member having two spaced arms pivotably supported at the spaced ends of the arms to the camera body, the viewing mirror support plate of the camera being pivotably supported at the opposite ends of the arms;
- a drive lever pivotably mounted at one end to the camera body and movable by the mirror-operating mechanism of the camera;
- a first connecting lever pivoted at one end to an arm of the U-shaped member and pivoted at the other end to the free end of the drive lever;
- a second connecting lever pivoted at one end with the first connecting lever to the free end of the drive lever and pivotally connected at the other end to the mirror plate; and
- the two connecting levers and portions of the U-shaped member arm and mirror plate between the pivotal connections forming substantially a parallelogram linkage system for moving the mirror between its viewing and raised position.